United States Patent [19]

Watanabe

[11] Patent Number: 5,519,412
[45] Date of Patent: May 21, 1996

[54] PATTERN PROCESSING METHOD

[75] Inventor: Kiyoshi Watanabe, Kawasaki, Japan

[73] Assignee: Canon Kabushiki Kaisha, Tokyo, Japan

[21] Appl. No.: 208,039

[22] Filed: Mar. 9, 1994

Related U.S. Application Data

[63] Continuation of Ser. No. 711,062, Jun. 6, 1991, abandoned.

[30] Foreign Application Priority Data

Jun. 11, 1990 [JP] Japan .................... 2-149810

[51] Int. Cl.$^6$ .................................................. G06F 3/00
[52] U.S. Cl. .................................... 345/128; 345/141
[58] Field of Search .................................. 340/730, 735, 340/750, 751, 790; 400/121; 345/192, 193, 141, 128, 129, 130

[56] References Cited

U.S. PATENT DOCUMENTS

| | | | |
|---|---|---|---|
| 3,859,461 | 1/1975 | Wiedenmann | 178/30 |
| 4,298,945 | 11/1981 | Kyte et al. | 364/523 |
| 4,748,443 | 5/1988 | Uehara et al. | 340/724 X |
| 4,897,638 | 1/1990 | Kokunishi et al. | 340/751 |
| 5,042,075 | 8/1990 | Sato | 345/128 |
| 5,091,973 | 2/1992 | Watanabe | 382/54 |
| 5,159,668 | 10/1992 | Kaasila | 395/151 |
| 5,305,433 | 4/1994 | Ohno | 345/128 |

FOREIGN PATENT DOCUMENTS

| | | | |
|---|---|---|---|
| 2198662 | 3/1974 | France | G06F 9/20 |
| 2588399 | 4/1987 | France | G06F 15/62 |
| 2638264 | 4/1990 | France | G06K 9/00 |
| 2646729 | 11/1990 | France | G06F 15/68 |
| 2183429 | 6/1987 | United Kingdom | G06F 15/66 |
| 2224420 | 5/1990 | United Kingdom | G09F 1/14 |

*Primary Examiner*—Richard Hjerpe
*Assistant Examiner*—Kara Farnandez Stoll
*Attorney, Agent, or Firm*—Fitzpatrick, Cella, Harper & Scinto

[57] ABSTRACT

A pattern processing apparatus comprises: a first memory which has character pattern data as coordinate array points and stores data indicating whether the coordinate points are the points constructing an outline of a character pattern or not; a second memory which stores absolute coordinate values as a reference point in the case where the coordinate points are not the points constructing the outline of the character pattern and also stores relative coordinate values from the reference point or another outline point or the absolute coordinate values as a reference point in the case where the coordinate points are the points constructing the outline of the character pattern; a reading device for receiving a character code and for reading out the coordinate data corresponding to the character code from the first or second memory on the basis of the character code; and a pattern forming device to form a character pattern corresponding to the character code from the coordinate data. Not only thicknesses of line segments of an outline constructing a character pattern but also stroke shapes of the line segments can be controlled, so that a character pattern can be generated at a high quality.

14 Claims, 8 Drawing Sheets

| COORDINATE POINT | OUTLINE FLAG | X-COORDINATES ABSOLUTE X | X-COORDINATES RELATIVE REFERENCE | X-COORDINATES RELATIVE ΔX | Y-COORDINATES ABSOLUTE Y | Y-COORDINATES RELATIVE REFERENCE | Y-COORDINATES RELATIVE ΔY | CURVE ATTRIBUTE FLAG |
|---|---|---|---|---|---|---|---|---|
| A1 | NON-OUTLINE | 100 | | | 200 | | | |
| A2 | NON-OUTLINE | 300 | | | 200 | | | |
| A3 | START | | A1 | −50 | | A1 | 220 | END/START |
| A4 | | | A1 | −20 | | A3 | −10 | |
| A5 | | | A1 | 20 | | A3 | −10 | |
| A6 | | | A1 | 50 | | A3 | 0 | END/START |
| A7 | | | A1 | 45 | | A3 | −20 | |
| A8 | | | A1 | 40 | | A3 | −30 | END |
| A9 | | | A1 | 40 | | A3 | −80 | START |
| A10 | | | A1 | 40 | | A1 | 20 | |
| A11 | | | A1 | 120 | | A10 | −10 | |
| A12 | | | A2 | −120 | | A10 | −10 | END |
| A13 | | | A2 | −40 | | A1 | 20 | START |
| A14 | | | A2 | −40 | | A3 | −80 | |
| A15 | | | A2 | −40 | | A3 | −30 | |
| A16 | | | A2 | −45 | | A3 | −20 | |
| A17 | | | A2 | −50 | | A3 | 0 | END/START |
| A18 | | | A2 | −20 | | A3 | −10 | |
| A19 | | | A2 | 20 | | A3 | −10 | |
| A20 | | | A2 | 50 | | A3 | 0 | END/START |
| A21 | | | A2 | 45 | | A3 | −20 | |
| A22 | | | A1 | 40 | | A3 | −30 | |
| A23 | | | A1 | 40 | | A3 | −80 | END |
| A34 | | | A2 | −40 | | A1 | −20 | START |
| A35 | | | A2 | −120 | | A34 | 10 | |
| A36 | | | A1 | 120 | | A34 | 10 | |
| A37 | | | A1 | 40 | | A1 | −20 | END |
| A48 | | | A1 | −40 | | A3 | −80 | START |
| A49 | | | A1 | −40 | | A3 | −30 | |
| A50 | END | | A1 | −45 | | A3 | −20 | |

PATTERN PROCESSING METHOD

This application is a continuation of application Ser. No. 07/711,062, filed Jun. 6, 1991, now abandoned.

BACKGROUND OF THE INVENTION

1. Field of the Invention

The invention relates to a pattern processing method regarding a character font memory to store character font data by a form of a coordinate point array, a character pattern generating apparatus using such a character font memory for generating a character pattern on the basis of the font data, or the like.

2. Related Background Art

As typical apparatuses using such a kind of character pattern generator, there are a printer, a display apparatus, and the like provided with character font data called vector fonts, outline fonts, or scalable fonts which can generate characters with various modifications or characters of many kinds of sizes.

In the above apparatuses, an outline of reference character data is provided as absolute coordinates of each of the coordinate points constructing such an outline, those coordinate values are multiplied on the basis of a magnification ratio or a reduction ratio according to a designated output size, the coordinate values of the outline corresponding to the designated character output size are calculated, and a character pattern is derived. Therefore, a variation occurs in thicknesses of line segments of a character which should inherently be uniform as shown in FIG. 4B due to a quantization error or the like which occurs when a character pattern is reflected to lattice points of a dot pattern at the designated character size to be finally generated. Particularly, in the case where a character pattern has been converted into a character of a small size, there is a problem such that a deterioration in apparent quality is remarkable.

Figure 4A:
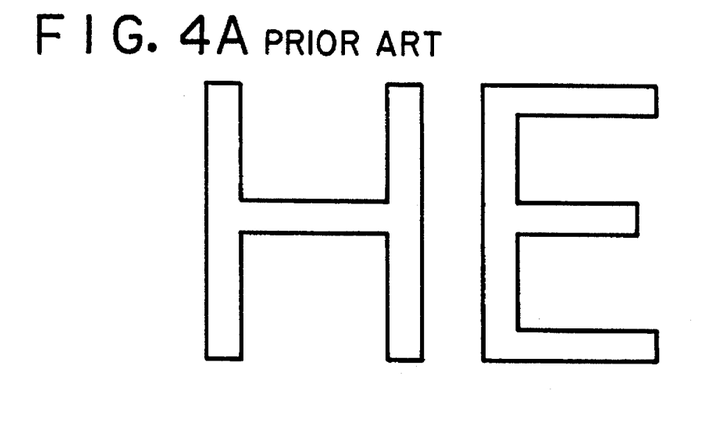
FIGS. 4A to 4C are diagrams showing an example in the case where outline character data "HE" of an European language type style has been generated by a conventional character generator.
Figure 4B:
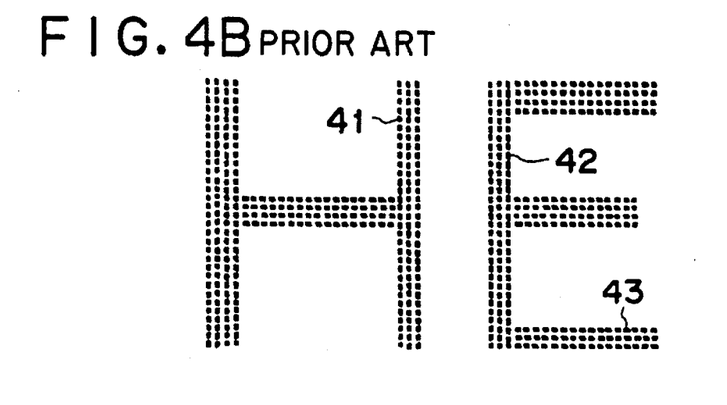

FIG. 4A is a diagram showing outline character pattern data of a type style Helvetica of European language fonts. FIG. 4B is a diagram showing an example of a dot pattern when characters have been developed into dot patterns by a conventional technique. As will be obviously understood from FIG. 4B, a vertical line portion shown by reference numeral 41 of a character "H" and lateral line portions shown by reference numerals 42 and 43 of a character "E" are reproduced thinner than the other portions due to a quantization error when converting character patterns into dot patterns.

Figure 4C:
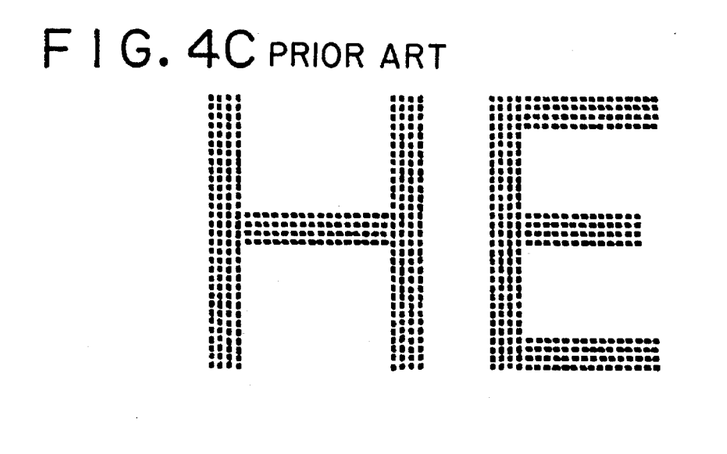

To solve the above problem, therefore, there is considered a method whereby an arbitrary coordinate point on an outline constructing reference character data is used as a reference, the coordinates of the reference point are stored as absolute coordinate values, other arbitrary coordinate points on the outline are made related by relative distances from the reference point, thereby preventing the deterioration in character quality mentioned above. FIG. 4C shows an example of character patterns which are generated as mentioned above. That is, by controlling thicknesses of vertical and horizontal lines constructing the character patterns, the thicknesses of the line segments shown at 41 to 43 in FIG. 4B are equalized with those of the other line segments, so that a character pattern of a higher quality can be generated.

In the above conventional example, however, only the thicknesses of the line segments constructing a character pattern can be controlled. To reproduce a design of a complicated stroke shape as represented by a type style such as Optima of European language fonts shown in, for example, FIG. 5A, asymmetrical unbalanced character patterns are obtained as shown in FIG. 5B and character patterns of a high quality cannot be displayed and generated.

SUMMARY OF THE INVENTION

The invention is made in consideration of the foregoing conventional apparatuses and it is an object of the invention to provide a character font memory which can generate character patterns of a high quality by making it possible to control not only thicknesses of line segments constructing character patterns but also stroke shapes of the line segments and to provide a character pattern generating apparatus using such a font memory.

To accomplish the above object, a character font memory of the invention has the following construction. That is, the character font memory has character pattern data as coordinate array points and includes a flag indicating whether the coordinate points are points which construct an outline of a character pattern or not, absolute coordinate values as a reference point in the case where the coordinate points are not the points which construct the outline of the character pattern and relative coordinate values from the reference point or another outline point or absolute coordinate values as a reference point in the case where the coordinate points are the points which construct the outline of the character pattern.

To accomplish the above object, a character pattern generating apparatus of the invention has the following construction. That is, there is provided a character pattern generating apparatus for reading out font data stored in a font memory and for developing into pattern data and for outputting, wherein the apparatus comprises: a character font memory which has character pattern data as coordinate array points and includes a flag indicating whether the coordinate points are points which construct an outline of a character pattern or not and absolute coordinate values as a reference point in the case where the coordinate points are not the points which construct the outline of the character pattern and relative coordinate values from the reference point or another outline point or absolute coordinate values as a reference point in the case where the coordinate points are the points which construct the outline of the character pattern; reading means for receiving a character code and for reading out font data corresponding to the character code from the character font memory on the basis of the character code; and pattern forming means for forming the character pattern corresponding to the character code from the font data.

In the above construction, the character font memory has the character pattern data as coordinate array points and stores by absolute coordinate values as a reference point in the case where the coordinate points are not the points which construct an outline of the character pattern and also stores by relative coordinate values from the reference point or another outline point or by the absolute coordinate values as a reference point in the case where the coordinate points are the points which construct the outline of the character pattern.

Still another object of the invention is to provide a pattern processing method for a character pattern generating apparatus, comprising the steps of: receiving a character code; reading out font data corresponding to the character code from a character font memory; and making a character pattern corresponding to the input character code from the font data.

DETAILED DESCRIPTION OF THE PREFERRED EMBODIMENT

A preferred embodiment of the invention will be described in detail hereinbelow with reference to the drawings. The invention can be applied to an apparatus or can be accomplished in a system comprising a plurality of apparatuses. The invention can be also accomplished by supplying a program to an apparatus or a system.
[Description of character pattern generating apparatus (FIG. 1)]

Figure 1:
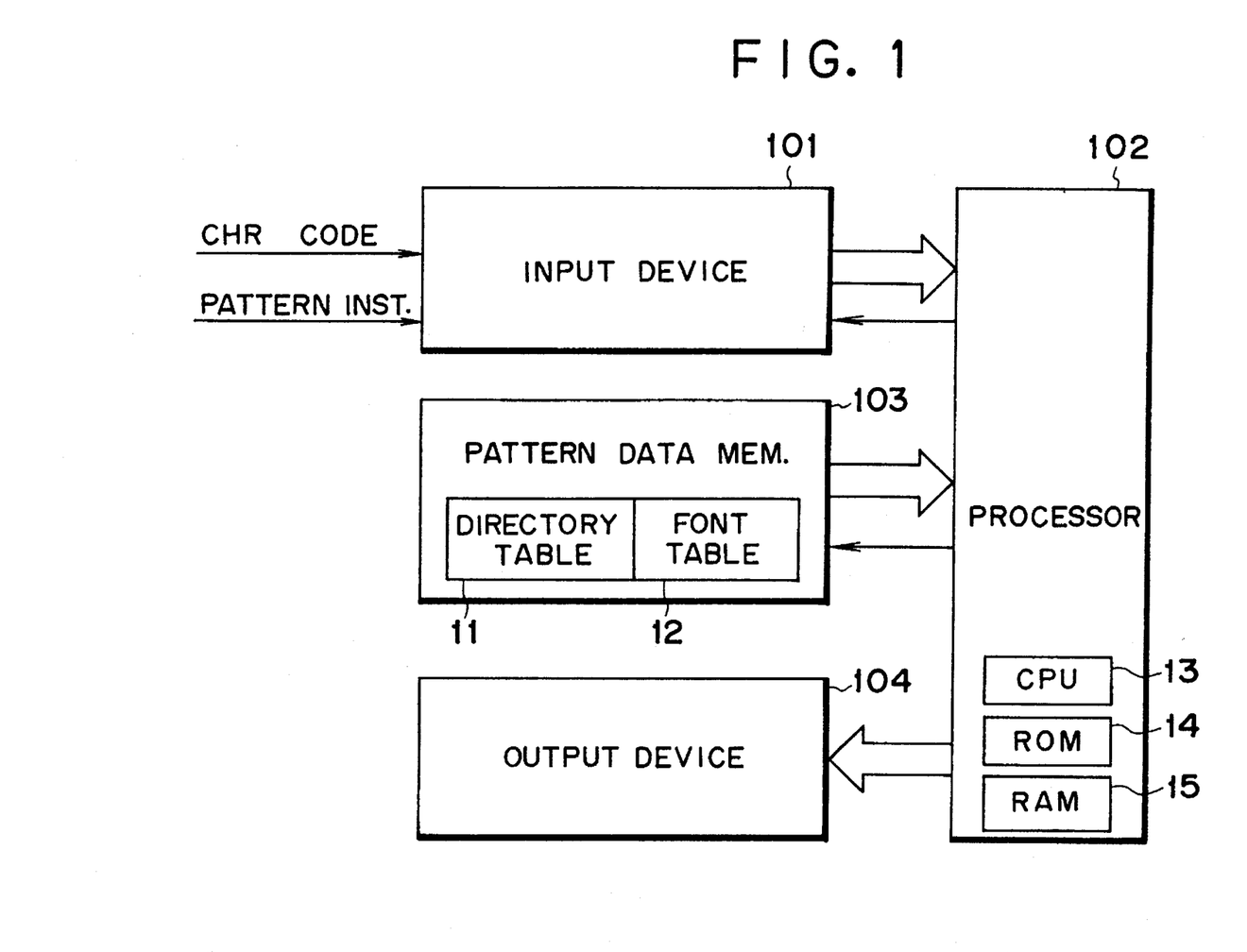
FIG. 1 is a block diagram showing a schematic construction of a character pattern generator of the preferred embodiment.

FIG. 1 is a block diagram showing a schematic construction of a character pattern generating apparatus of an embodiment of the invention.

In FIG. 1, reference numeral 101 denotes an input device. For example, a character code signal, a pattern generating instruction, or the like as an object to be generated is supplied from an external apparatus or the like (not shown) to the input device 101. The input device 101 includes a signal holding circuit such as a buffer or flip-flop and the like. Reference numeral 102 denotes a processor to generate a character pattern of designated size and type style in accordance with the character code signal, pattern generating instruction, or the like which has been supplied from the input device 101. For instance, the processor 102 has: a central processing unit (CPU) 13 such as a microprocessor or the like; ROM 14 in which a control program of the CPU 13 and various data have been stored; RAM 15 which is used as a work area of the CPU 13; and the like.

Reference numeral 103 denotes a pattern data memory. Character pattern data comprising an outline shape of a character as a set of dot coordinates and character attribute data have previously been stored in memory addresses corresponding to a character code in the memory 103. The memory 103 is constructed by a non-volatile memory such as a disk, read only memory, or the like. Reference numeral 104 denotes an output device to display and output the character pattern which has been processed by the processor 102. The output device 104 has: a signal holding circuit; a parallel/serial signal converting circuit; and a printing or displaying section such as a printer, display, or the like. The operations of the input device 101, pattern data memory 103, and output device 104 are controlled by the processor 102.
[Description of pattern data memory (FIGS. 2 and 3)]

Figure 2:
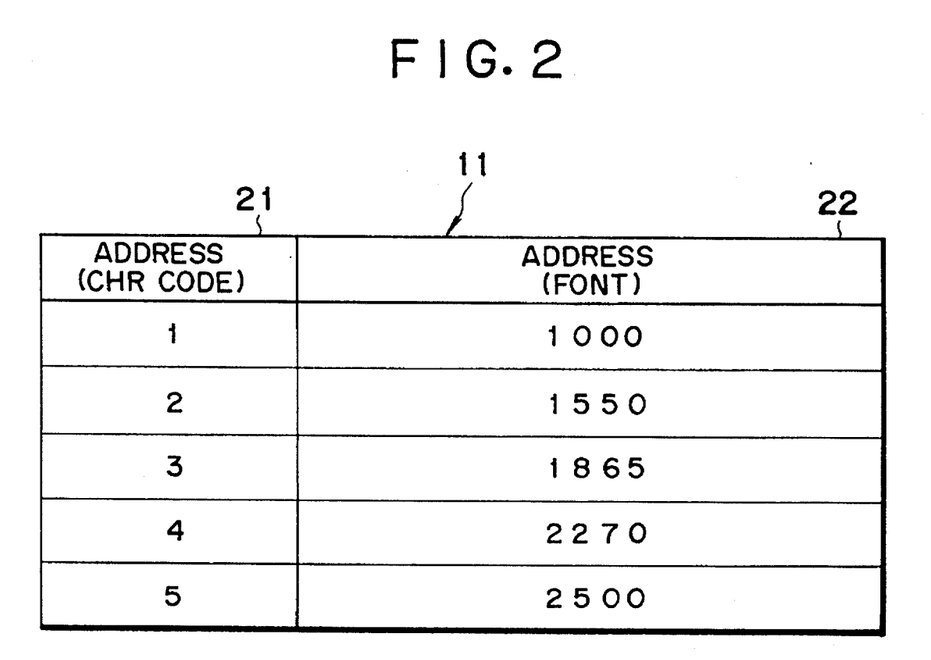
FIG. 2 is a diagram showing an example of a content in a directory table of the embodiment of FIG. 1.

FIG. 2 is a diagram showing an example of the memory contents in a directory table 11 in the pattern data memory 103 in FIG. 1.

In FIG. 2, reference numeral 21 denotes an address area which is addressed on the basis of a character code. Font data of the corresponding character code has been stored in the address area. That is, in FIG. 2, it will be understood that the font data of the character code "1" is stored from address "1000" in a font table 12 and the font data of the character code "2" is stored from address "1550" in the font table 12.

Figure 3A:
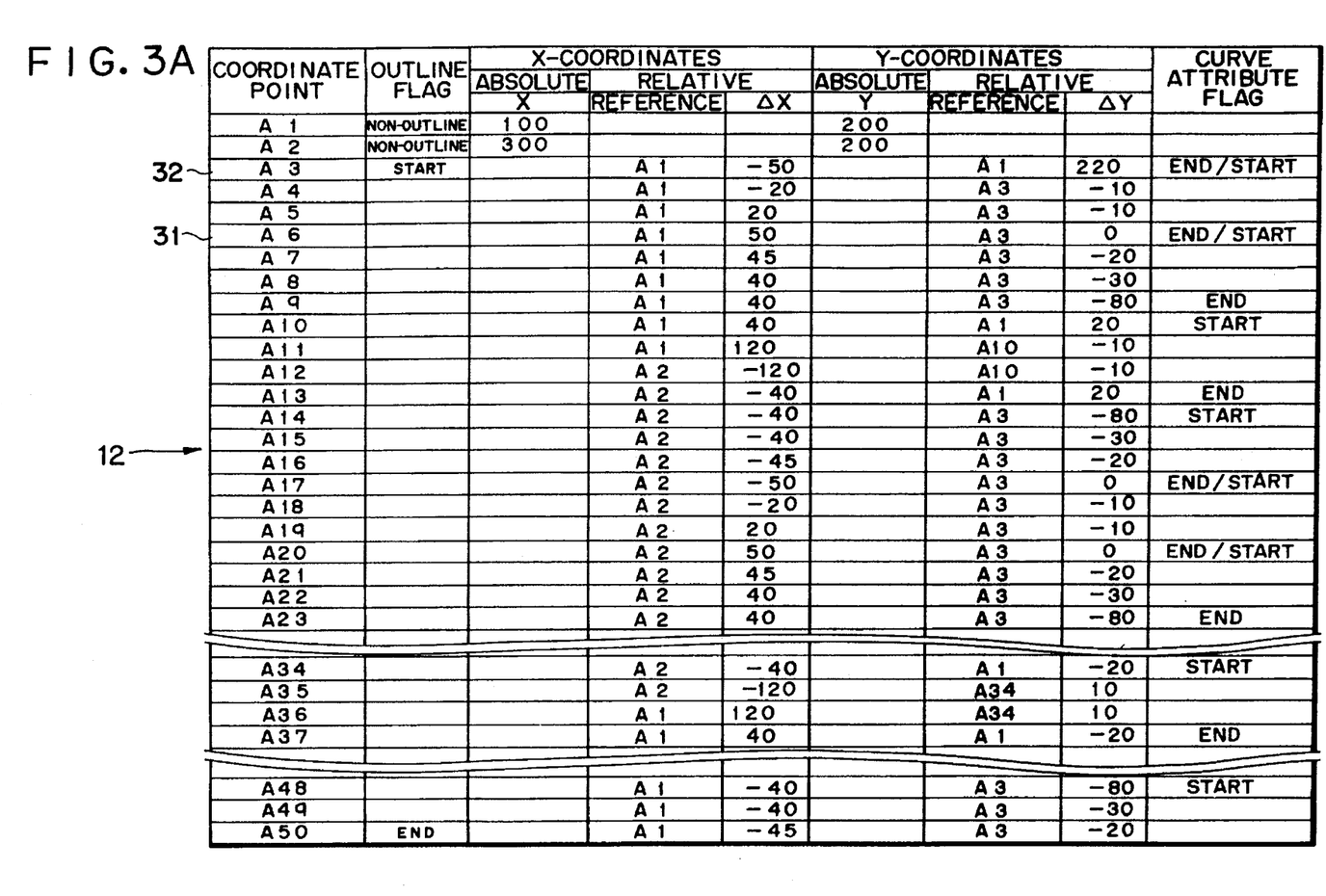
FIG. 3A is a diagram showing an example of a data construction of a font table of a character "H" in FIG. 3B in the embodiment of FIG. 1.
Figure 3B:
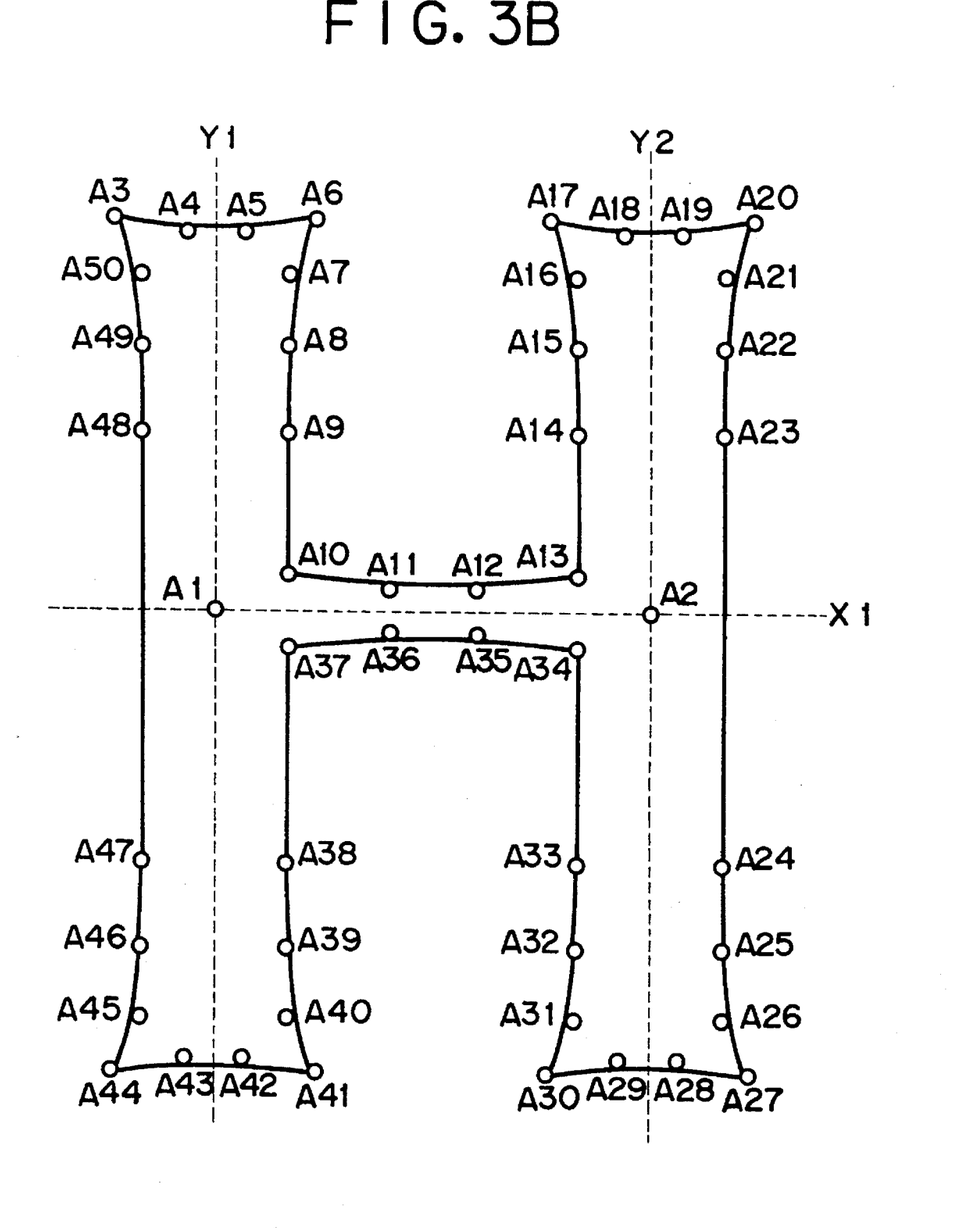
FIG. 3B is a diagram showing coordinate reference points and outline points of a character "H" in the embodiment of FIG. 1.

FIG. 3A is a diagram showing an example of a font data of a character pattern "H" shown in FIG. 3B which has been stored in the font table 12. FIG. 3B is a diagram showing outline points and reference points of pattern data of an European language character "H". Explanation will be made hereinbelow while making the contents in the font table 12 shown in FIG. 3A and the character pattern of FIG. 3B correspond each other.

The European language character "H" as shown in FIG. 3B is expressed by coordinate values of a plurality of points in which coordinate values of control points starting from the coordinate values of a coordinate point $A_1$ (coordinate reference point) have been vector developed as shown in FIG. 3A. Coordinate points $A_1$ and $A_2$ are coordinate reference points which are not included in the outline constructing the character. That is, a flag indicating whether the coordinate points are the points which construct the outline of the character pattern or not is set to OFF for such coordinate reference points $A_1$ and $A_2$. Only the coordinate reference points are expressed by absolute coordinate values in the case (X, Y) of the preferred embodiment.

As shown in FIG. 3A, a coordinate point train actually constructing the outline of the character "H" is expressed by an array of the coordinate points $A_3$ to $A_{50}$. The flag indicating whether the coordinate points are the points constructing the outline of the character pattern which is formed by the coordinate points or not is set to ON. Fundamentally, those character points are expressed by relative distances from the coordinate points $A_1$ and $A_2$ as coordinate reference points. However, the relation between the coordinate reference points serving as a "mother" and the coordinate points serving as "children" may have a hierarchy structure as shown by Y coordinates of, for instance, the coordinate points $A_4$ to $A_9$ and $A_{11}$, that is, a structure such that a "child" is replaced to "mother" and "children" exist under the "mother".

It is needless to say that the data of the coordinate reference points is not the data as coordinate points but can be also prepared as reference values in another form. The coordinate reference points are not necessarily included in the outline of the character. On the other hand, the number of coordinate reference points is not limited to a plural number but can be also set to one.

A construction of the font table 12 in FIG. 3A will now be described. The outline point $A_3$ is a start point of the outline and is expressed by the relative coordinates ($A_1$–50, $A_1+220$) from the reference point $A_1$. A portion from the outline point $A_3$ to the outline point $A_6$ is defined as one curve. The outline point $A_6$ is a start point of the next curve. The above point will be understood from the fact that both of end and start flags of a curve attribute flag 31 of the outline point $A_6$ are set to ON. A portion from the outline point $A_6$ to the outline point $A_9$ is defined as one curve and the start flag of the curve at the outline point $A^9$ is not set to ON. Therefore, a portion between the outline points $A_9$ and $A_{10}$ is defined by a straight line. In a manner similar to the above, portions among the outline points $A_{48}$, $A_{49}$, $A_{50}$, and $A_3$ are defined by one curve and the outline of the character "H" shown in FIG. 3B is formed.

Figure 6A:
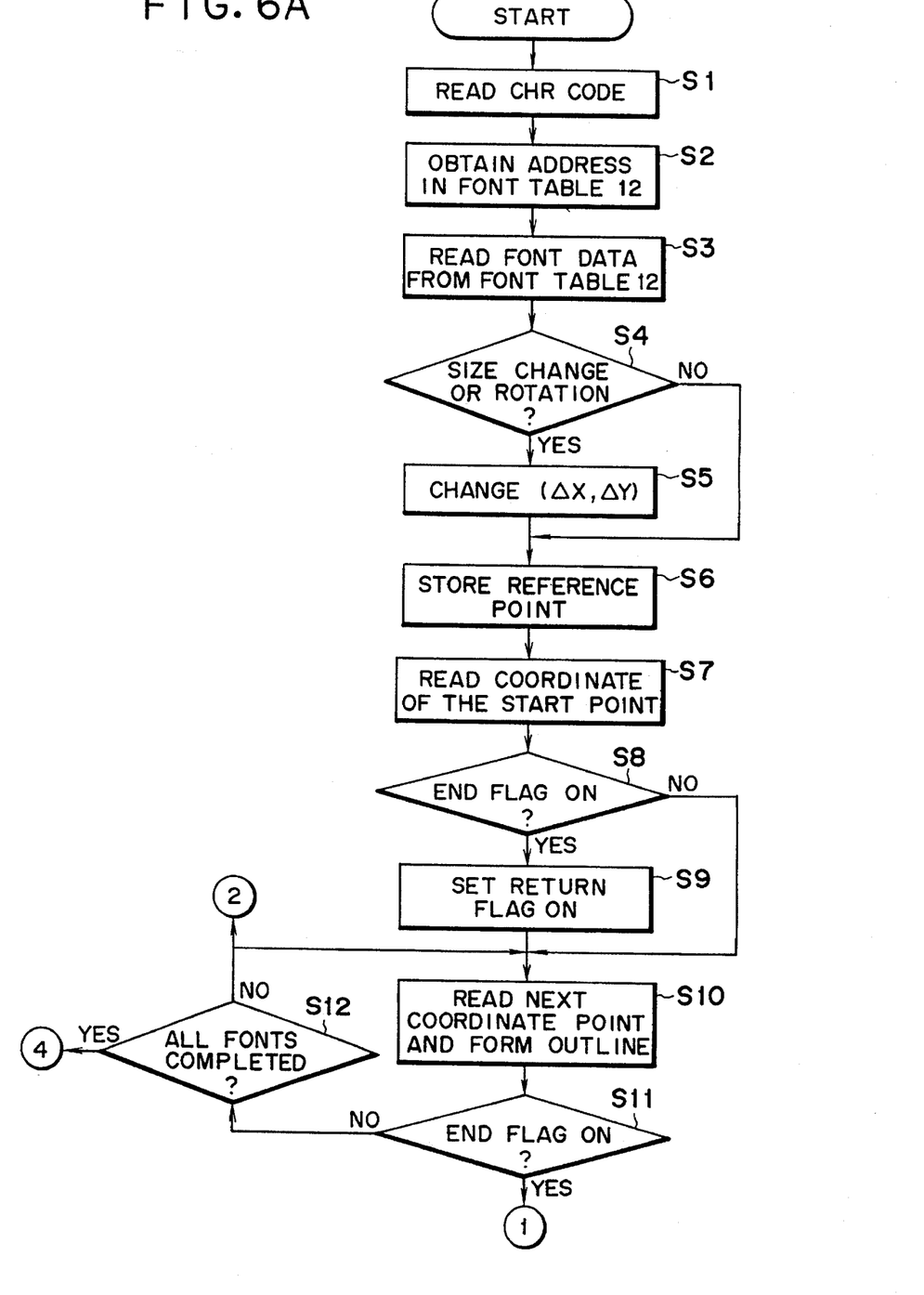
FIGS. 6A and 6B are flowcharts showing character pattern generating processes according to the character pattern generating apparatus of the embodiment of FIG. 1.
Figure 6B:
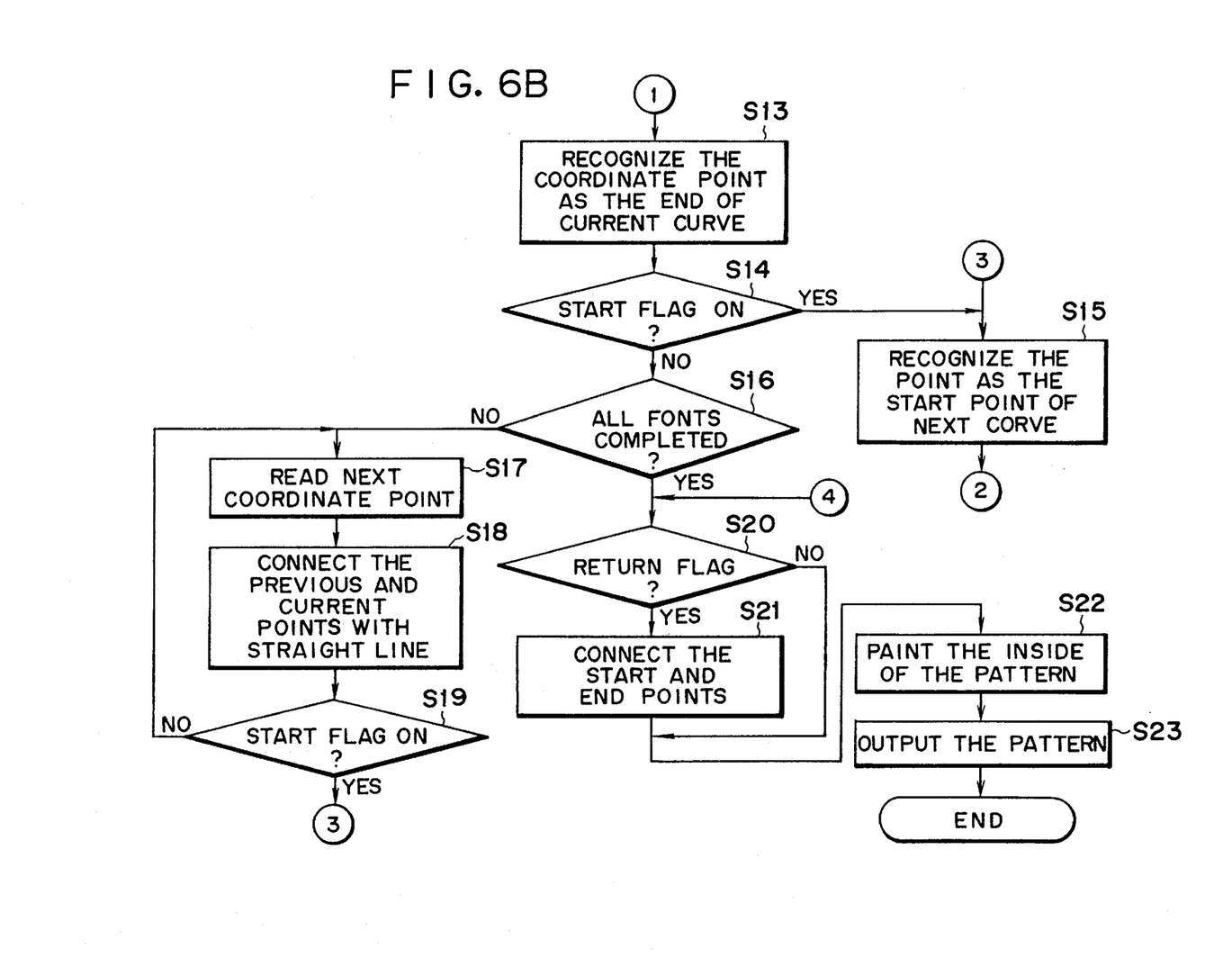

FIG. 6 is a flowchart showing a generating process of a character pattern in the character pattern generating apparatus according to the embodiment. The control program to execute the above process has been stored in the ROM 14 in the processor 102.

The above processing routine is started when the character code signal, pattern generating instruction, or the like is supplied from the input device 101 to the processor 102. The processing routine will now be described on the assumption that the generation of a character pattern "H" as shown in FIG. 3A has been instructed.

The input character code is first read out in step S1. In step S2, an address in the font table 12 in which the font data of the input character code has been stored is read out with reference to the directory table 11. After the address was obtained as mentioned above, the font data is read out of the font table 12 in step S3.

A check is made in step S4 to see if an instruction of a size change, a rotation, or the like of the character is included in the pattern generating instruction or not. If there is a size change instruction, for instance, step S5 follows and the relative coordinates ($\Delta x$, $\Delta y$) of the font data are variably magnified in accordance with the size change data. If the character rotation or the like has been instructed in step S4, the coordinates $\Delta x$ and $\Delta y$ are converted in accordance with the rotation data. At this time, since the values of $\Delta x$ and $\Delta y$ are rounded to integer values in order to prevent a quantization error on the dot pattern.

The processing routine advances to step S6 and the reference coordinates (coordinate values of $A_1$ and $A_2$ in the example of FIG. 3) of the font data are stored. In step S7, the coordinate values of the start point ($A_3$) are read out and the absolute coordinates are obtained on the basis of the coordinate values of the reference point. A check is made in step S8 to see if the end flag of the curve flag of the start point has been set to ON or not. If it has been set to ON, step S9 follows and the return flag of the RAM 15 is set to ON.

The processing routine advances to step S10, the coordinate values (magnified values if the coordinates have already been magnified) of the next coordinate point are read out and line segments serving as an outline are formed on the basis of the coordinate values of the previous outline point. In the next step S11, a check is made to see if the end flag of the curve attribute flag of the outline point which had been newly read out has been set to ON or not. If NO, step S12 follows and a check is made to see if all of the fonts have been read out or not. If all of the font data are not read out yet, the processing routine is returned to step S10.

If the end flag has been set to ON (for example, outline point $A_6$) in step S11, step S13 follows and the coordinate values which have been read out in step S10 are set to an end point of the current curve. Then, step S14 follows and a check is made to see if the start flag of the outline point has been set to ON or not. If YES (for instance, it is set to ON in the case of the outline point $A_6$), step S15 follows and the outline point is set to a start point of the next curve. Then, the processing routine is returned to step S10.

If the start flag is not set to ON in step S14, namely, if only the end flag has been set to ON (for example, like the outline point $A_9$), step S17 follows and the next outline point ($A_{10}$) is read out. Then, step S18 follows and the previous outline point ($A_9$) and the outline point ($A_{10}$) which has been read out in step S17 are connected by a straight line. Step S19 then follows and a check is made to see if the start flag of the outline point which had been read out in step S18 has been set to ON or not. If NO, a straight line portion still exists. Therefore, the processing routine is returned to step S17. If the start flag has been detected (in the case of the outline point $A_{10}$, the start flag is set to ON), step S15 follows and the foregoing process is executed.

If all of the font data has been read out in step S16 or S12 (for instance, when the outline point $A_{50}$ has been read out), a check is then made in step S20 to see if the return flag has been set to ON or not, that is, whether the first start point of the outline coincides with the end point of the outline or not. In the case of FIG. 3A, since the start point $A_3$ of the outline coincides with the start point, the processing routine advances to step S21 and the start point ($A_3$) and the end point ($A_{50}$) of the outline are connected. After the outline of the character pattern was formed as mentioned above, step S22 follows and the inside of the outline of the character pattern is painted out, thereby forming a character dot pattern. After the dot pattern was formed as mentioned above, step S23 follows and the dot pattern is stored into the RAM 15 or transferred to the output device 104 comprising a display, printer, or the like and the processing routine is finished.

Figure 5A:
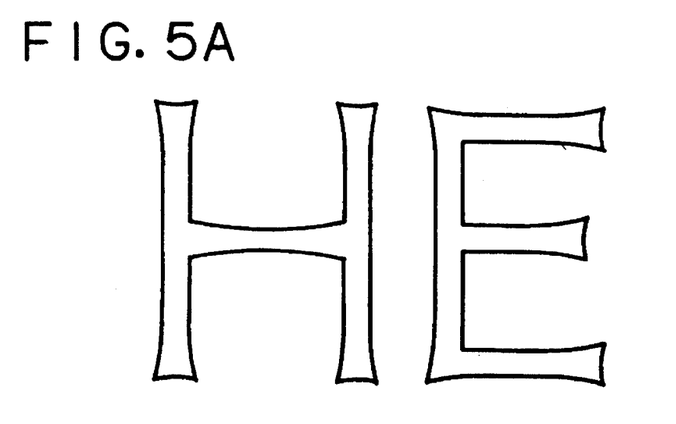
FIG. 5A is a diagram showing outline character data "HE" of an European language type style Optima.
Figure 5B:
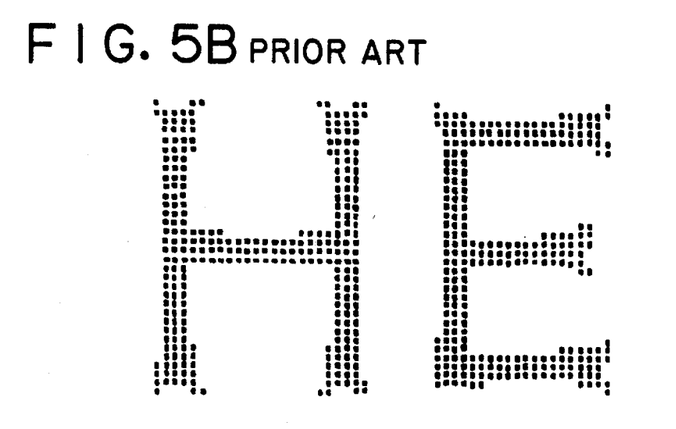
FIG. 5B is a diagram showing an example in the case where the characters "HE" of FIG. 5A have been converted into dot patterns by a conventional apparatus.
Figure 5C:
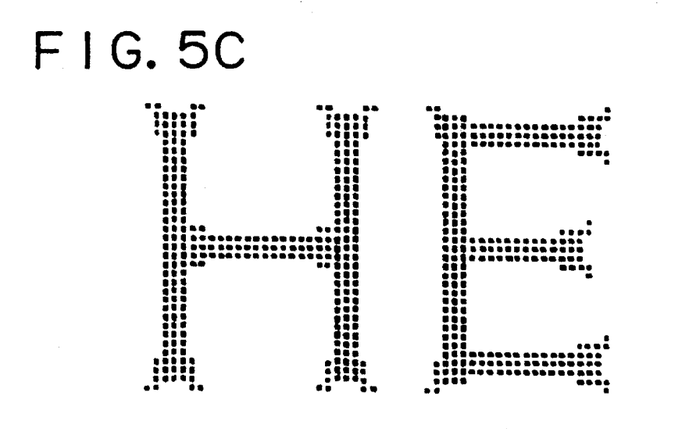
FIG. 5C is a diagram showing an example in the case where the characters "HE" in FIG. 5A have been converted into the dot patterns by the character pattern generating apparatus of the embodiment of FIG. 1.

FIG. 5C is a diagram showing a practical output example of character patterns "HE" shown in FIG. 5A according to the preferred embodiment. The kind of the curve used in the preferred embodiment relates to the B spline curve. However, the kind of outline segments constructing the character can be also set to another curve (Bezier curve or the like) or a straight line.

As described above, according to the preferred embodiment, a character of a complicated shape which could not be generated at a high quality hitherto can be generated at a high quality and at a character size in a wide range without deteriorating the quality even after completion of the enlargement or reduction calculation by making the thicknesses of line segments uniform and by keeping a symmetry of the line segments.

As described above, according to the invention, there is an effect such that a character of a complicated shape which could not be generated at a high quality hitherto can be generated at a high quality and at a character size in a wide range without deteriorating the quality even after completion of the enlargement, reduction, or modification calculation by making the thicknesses of line segments uniform and by keeping a symmetry of the line segments.

I claim:

1. A character pattern generating apparatus comprising:

memory means for storing reference coordinate information, consisting of x and y coordinates, for representing at least one reference point not included in an outline forming a character and relative coordinate information representing a relative distance, consisting of x and y components, to a coordinate point on an outline forming the character from another coordinate point or from a reference point;

means for size changing each of the x and y components of the relative coordinate information stored in said memory means in response to a magnification ratio of a character to be generated and making each of the size-changed x and y components become an integer;

means for deriving absolute coordinate information of an outline forming the character to be generated, based on the x and y coordinates of the reference coordinate information stored in said memory means and the x and y components of the relative coordinate information made integers by said size changing means; and generating means for generating a character pattern based on the absolute coordinate information derived by said deriving means.

2. An apparatus according to claim 1, further comprising means for outputting the character pattern generated by said generating means.

3. An apparatus according to claim 2, wherein said output means comprises a printer.

4. An apparatus according to claim 2, wherein said output means comprises a display device.

5. An apparatus according to claim 1, further comprising means for inputting code information of the character to be generated.

6. An apparatus according to claim 1, wherein the reference point is included in an outline forming a character.

7. An apparatus according to claim 1, wherein the reference point is not included in an outline forming a character.

8. A character pattern generating method using a memory for storing reference coordinate information, consisting of x and y coordinates, for representing a reference point not included in an outline forming a character and relative coordinate information representing a relative distance, consisting of x and y components, to a coordinate point on an outline forming the character from another coordinate point or from the reference point, said method comprising the steps of:

size changing each of the x and y components of the relative coordinate information stored in the memory, in response to a magnification ratio of a character to be generated and making each of the size-changed x and y components become an integer;

deriving absolute coordinate information of an outline forming the character to be generated, based on the x and y coordinates of the reference coordinate information stored in the memory and the x and y components of the relative coordinate information made integers in said size-changing step; and generating a character pattern based on the absolute coordinate information derived in said deriving step.

9. A method according to claim 8, further comprising the step of outputting the character pattern generated in said generating step.

10. A method according to claim 9, wherein said outputting step is performed using a printer.

11. A method according to claim 9, wherein said outputting step is performed using a display device.

12. A method according to claim 8, further comprising the step of inputting code information of the character to be generated.

13. A method according to claim 8, wherein the reference point is included in an outline forming a character.

14. A method according to claim 8, wherein the reference point is not included in an outline forming a character.

* * * * *